(12) United States Patent
Cropp et al.

(10) Patent No.: US 11,727,140 B2
(45) Date of Patent: Aug. 15, 2023

(54) SECURED USE OF PRIVATE USER DATA BY THIRD PARTY DATA CONSUMERS

(71) Applicant: MICROSOFT TECHNOLOGY LICENSING, LLC., Redmond, WA (US)

(72) Inventors: Ryan Gregory Cropp, Redmond, WA (US); Edward Arthur Scott Low, Seattle, WA (US); Lillian Kravitz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 382 days.

(21) Appl. No.: 16/874,629

(22) Filed: May 14, 2020

(65) Prior Publication Data
US 2021/0357528 A1 Nov. 18, 2021

(51) Int. Cl.
*G06F 21/62* (2013.01)
*G06F 3/0482* (2013.01)
(Continued)

(52) U.S. Cl.
CPC ........ *G06F 21/6245* (2013.01); *G06F 16/248* (2019.01); *G06F 16/252* (2019.01);
(Continued)

(58) Field of Classification Search
CPC .. G06F 21/6245; G06F 16/248; G06F 16/252; G06F 21/6227; G06F 3/0482; G06F 21/6263
See application file for complete search history.

(56) References Cited

U.S. PATENT DOCUMENTS

| 5,961,593 A | 10/1999 | Gabber et al. |
| 7,120,928 B2 | 10/2006 | Sheth et al. |

(Continued)

FOREIGN PATENT DOCUMENTS

WO   2016063092 A1   4/2016

OTHER PUBLICATIONS

"Non-Final Office Action Issued in U.S. Appl. No. 16/874,635", dated May 11, 2021, 13 Pages.
(Continued)

*Primary Examiner* — Andrew T Chiusano
(74) *Attorney, Agent, or Firm* — Newport IP, LLC; Jacob P. Rohwer

(57) ABSTRACT

Disclosed herein is a system configured to collect and maintain user data within a first party silo while allowing third party data consumers to use the user data in accordance with explicit input from users. The system provides a user with transparency and control with regard to data use by displaying graphical user interfaces configured to receive input indicating whether the user allows or prevents third party data consumers to use his or her data. The system exposes an API that enables the third party data consumers to submit a data query. The system uses the data query to internally analyze a user data set. User data is included in the user data set in accordance with the input. The system is configured to provide, via the API, a result of the analysis to the third party data consumer that submitted the data query without providing the user data set.

15 Claims, 12 Drawing Sheets

(51) Int. Cl.
    *G06F 16/248*     (2019.01)
    *G06F 16/25*     (2019.01)

(52) U.S. Cl.
    CPC ........ *G06F 21/6227* (2013.01); *G06F 3/0482* (2013.01); *G06F 21/6263* (2013.01)

(56) References Cited

U.S. PATENT DOCUMENTS

| | | |
|---|---|---|
| 7,203,909 B1 | 4/2007 | Horvitz et al. |
| 8,301,493 B2 | 10/2012 | Sanders et al. |
| 8,612,891 B2 | 12/2013 | Singh et al. |
| 10,832,299 B1* | 11/2020 | Clauss ............... G06Q 30/0611 |
| 2002/0023059 A1 | 2/2002 | Bari et al. |
| 2011/0083013 A1* | 4/2011 | Nice ................... G06F 21/6263 713/168 |
| 2011/0173071 A1 | 7/2011 | Meyer et al. |
| 2012/0323794 A1 | 12/2012 | Livshits |
| 2013/0006748 A1* | 1/2013 | Horvitz ................. G06Q 30/02 705/14.39 |
| 2013/0097046 A1 | 4/2013 | Krishnamurthy et al. |
| 2013/0174274 A1* | 7/2013 | Friedman ............... G06F 21/604 726/28 |
| 2013/0276136 A1 | 10/2013 | Goodwin et al. |
| 2013/0276142 A1 | 10/2013 | Peddada et al. |
| 2014/0278991 A1 | 9/2014 | Sandoval |
| 2014/0344015 A1 | 11/2014 | Puertolas-Montanes et al. |
| 2014/0365350 A1 | 12/2014 | Shvarts |
| 2015/0142686 A1* | 5/2015 | Baldwin .............. G06Q 50/265 705/325 |
| 2016/0034705 A1 | 2/2016 | Horvitz et al. |
| 2016/0191351 A1 | 6/2016 | Smith et al. |
| 2016/0301764 A1* | 10/2016 | Ruback ................. H04W 12/02 |
| 2017/0099359 A1 | 4/2017 | Bejerasco et al. |
| 2017/0279616 A1 | 9/2017 | Loeb et al. |
| 2018/0053200 A1* | 2/2018 | Cronin ................... G16H 20/30 |
| 2018/0343215 A1 | 11/2018 | Ganapathi et al. |
| 2019/0163790 A1* | 5/2019 | Jennings ................ G06N 20/20 |
| 2019/0356719 A1 | 11/2019 | Povar et al. |
| 2021/0065882 A1* | 3/2021 | McLeod ............... G06T 7/0014 |
| 2021/0133196 A1* | 5/2021 | Gladwin ........... G06F 16/24564 |
| 2021/0357529 A1 | 11/2021 | Kravitz |
| 2021/0409412 A1* | 12/2021 | Mohamed ............. H04L 63/101 |
| 2023/0064267 A1* | 3/2023 | Krutsch ........... G08G 1/096838 |

OTHER PUBLICATIONS

UBDI, "Universal Basic Data Income", In White Paper and Presentation, Jan. 2019, 53 Pages.

Wood, et al., "An App That Pays You For Your Data? Yes, Actually", Retrieved From: https://www.marketplace.org/shows/marketplace-tech/an-app-that-pays-you-for-your-data-yes-actually/popout/, Sep. 26, 2019, 13 Pages.

"International Search Report and Written Opinion Issued in PCT Application No. PCT/US2021/022273", dated May 28, 2021, 14 Pages.

"International Search Report and Written Opinion Issued in PCT Application No. PCT/US21/022270", dated Jun. 28, 2021, 10 Pages.

"Final Office Action Issued in U.S. Appl. No. 16/874,635", dated Jan. 7, 2022, 19 Pages.

"Notice of Allowance Issued in U.S. Appl. No. 16/874,635", dated Jun. 15, 2022, 7 Pages.

\* cited by examiner

SECURED USE OF PRIVATE USER DATA BY THIRD PARTY DATA CONSUMERS

BACKGROUND

Currently, network entities that provide and/or host network-based resources (e.g., a web site, a browser, a search engine, an "app", etc.) enable third party trackers (e.g., cookies, scripts, etc.) to scrape data about users when the users use the network-based resources. The scraped data is often shared and/or sold by companies that develop these third party trackers so that the data can be used for various reasons, such as targeted advertising. This typically happens behind the scenes unbeknownst to the users of the network-based resources.

While some network-based resources offer and/or enable the use of extensions or plugins to prevent the execution of third party trackers on browsers, these extensions or plugins are largely ineffective because they can block access to network content that is pertinent to the users and/or they can cause errors and prompts that frustrate the user experience. The data scraped by third party trackers is also often used to make incorrect conclusions or presumptions with regard to user interests or user circumstances, which can further frustrate the user experience. As an illustrative example, a non-parent user may have purchased an outfit for a newborn niece online. This purchase data is obtained and noted by a third party tracker. Subsequently, this purchase data is incorrectly used to presume that the non-parent user has a newborn child. Accordingly, targeted advertisements for baby clothes are displayed for the user for an extended period of time (e.g. over the next two to three weeks), even though the user is not currently a parent and the purchase of the newborn outfit was a one-time occurrence. That is, the non-parent user has no further interest in purchasing additional baby clothes.

Accordingly, users have limited or no control over how the data they generate by interacting with network-based resources is used, and the example in the preceding paragraph is but one illustration of how this may frustrate the user experience. Even worse, users typically do not know with whom their data is being shared. For instance, a backend company executing a third party data tracker may sell the user data to a political organization with a clear agenda. This may be against the user's wishes because the user strongly dislikes partisan politics. The aforementioned example shows how the use of user data is hidden to the general population, and via the use of third party trackers, this use is often conducted by companies that are unfamiliar to most people in the general population. This type of activity naturally concerns organizations (e.g., governments, consumer protection groups, etc.) that have a strong interest in data privacy. Further, this type of activity allows for unfair data sharing (e.g., data selling) practices.

It is with respect to these and other considerations that the disclosure made herein is presented.

SUMMARY

The techniques disclosed herein describe a system configured to maintain user data in a secure and private way within a first party silo while allowing the internal use of the user data by third party data consumers, in accordance with explicit input from the user. Stated alternatively, while use of the data is approved by the user within a first party context, the actual user data is not shared with the third party data consumers. As further described herein, use of user data by third party data consumers can provide some clear benefits to individual users and/or the general population. For example, some users that enjoy obtaining various products over the Internet welcome targeted advertising. In another example, an aggregation of user location data can assist in determining amounts of traffic and provide end users with a quickest route from one location to another. These are only two of many examples of how user data can be consumed to benefit an individual user or the general population. It is understood in the context of this disclosure, that data use can be implemented for a variety of purposes.

However, as described above, the use of user data by third party data consumers can also expose vulnerabilities with respect to privacy and/or frustrate the user experience. Accordingly, the techniques described herein provide users with transparency and control over how their data is used. In the context of this disclosure, a "first party" corresponds to a network entity that provides and/or hosts a network-based resource. A network-based resource may be associated with, or referred to, as a service that is offered to users. Examples of a service include, but are not limited to: a browsing service, an online search service, a news service, a payment service, a gaming service, a social network service, an enterprise network service, a chat service, a streaming service, a marketplace service, productivity services (e.g., a word processing application, a spreadsheet application, a presentation application, a collaboration or video conference application, an email client, a calendar application, etc.), a map/traffic service, a weather service, and so forth. The service may be offered via a browser (e.g., a Web application), a stand-alone application, an operating system component, and/or a sensor, each of which may be installed on a user device.

Users and corresponding user devices may be referred to herein as "data generators", as they are the ones that generate valuable data that can be used by the network entity and/or third party data consumers to the benefit of individual users and/or the general population. Network entities that develop and offer services to the users may be referred to herein as "data aggregators". External network entities that want to analyze the user data collected by a data aggregator to determine actionable information may be referred to herein as "third party data consumers". As a general example, a data aggregator is likely a company or organization that is able to collect a large amount of user data (e.g., "rich" data feature sets) via various services that are popular and used by a large number of users. In contrast, a third party data consumer is likely a company that may have an online presence, but does not have the ability to collect as much user data as the data aggregator. For instance, the third party data consumer may be a company that hosts a single web site (e.g., "www.shoppingcompanyABC.com"). Accordingly, while the third party data consumer may collect and use its own user data based on interactions with its web site and in accordance with user approval, the third party data consumer may want to execute a data query on a richer data set that it does not, or cannot, possess. Hence, the third party data consumer may take the necessary steps to access a rich data feature set maintained by a data aggregator to obtain a more robust conclusion.

As described above, once a user generates data by using and interacting with a service, the further use of this data is often opaque to the user. The system described herein allows a first party data aggregator to enable use of the user data by a third party data consumer without sharing the actual user data with the third party data consumer. To do this, the data aggregator configures application programming interfaces (APIs) that allow third party data consumers to request use of the user data by submitting a data query. The data query may comprise an algorithm to be executed internally by the data aggregator on the actual user data. Consequently, in accordance with the techniques described herein, data aggregators never provide a direct view of the raw user data to a third party data consumer. Instead, the data aggregator sends the third party data consumers the results of data queries which are internally executed on various data sets.

The system described herein is transparent in that a user is allowed to control whether his or her data is included in a data set used in the data queries. In one configuration, the system can prompt the user for general authorization to use his or her data in data queries submitted by third party data consumers. This general authorization can apply to data queries that have already been received and are currently being executed on a particular data set. Alternatively, this general authorization can apply to future data queries that have not yet been received. In various embodiments, the general authorization can be provided at a granular level for different services and/or different data categories. In one example, although general authorization for use of data in association with a data query is previously provided, the system can be configured to notify the user of a specific data query and an identification of a third party data consumer that submitted the data query. The notification can include, or provide access to, an option for the user to opt out or prevent user of his or her data for the data query.

Data categories can be broadly or narrowly defined and can include, for example: browsing data, search data, payment data, health/exercise data, location data, social network data, news consumption data, etc. An additional data category can include personal information including one or more of an age or age range, a gender or gender identification, ethnicity, a profession, an income level, family information, personal interests, etc. This personal information can be defined via an account used to access various service(s). While the techniques described herein can be implemented on user data that is not supplemented with this personal information, this personal information provides value when it supplements other user data. Accordingly, via the techniques described herein, a user has the ability to define which aspects of his or her personal information can be used to supplement his or her browsing data, searching data, social network data, and so forth.

In another configuration, the system can prompt the user for authorization to use his or her data for a specific data query. In other words, in accordance with a defined setting, the system can provide transparency to the user on a query-by-query basis. In this configuration, the prompt can inform the user of the data query, identify the third party data consumer that is the source of the data query, describe the data query, and/or ask the user for approval to use his or her data for the data query. While users may have more control and transparency using this other configuration, some users may prefer the general authorization configuration so that they do not have to expend the effort to provide input on a query-by-query basis.

In various embodiments, the system causes one or more graphical user interfaces (UIs) to be displayed to the user to enable the user to control how his or her data is used. The graphical UI can present UI elements configured to receive input indicating whether the user allows or prevents use of the user data collected via one or more services. As described above, the graphical UIs can list the different services from which the data is collected. Moreover, the graphical UIs can list different data categories into which the collected data can be assigned. The graphical UIs can enable the user to allow or prevent data use at a more granular level by selecting one or more of the services and/or the data categories for which collected data can be used by third party data consumers.

Based on the reception of a data query via an API, the system associates the data query with an appropriate user data set. The system analyzes the user data set in accordance with the data query. For instance, the data query may include an algorithm that is executed on the user data set to draw one or more conclusions. The system then provides, via the API, a result of the analysis to the third party data consumer without providing the user data set to the third party data consumer.

In various embodiments, the system is configured to offer an incentive for the user to allow the use of his or her user data by the third party data consumers. The system can provide the incentive to the user based on input indicating that the user allows the use of his or her user data by the third party data consumers.

Consequently, the system described herein provides a platform that standardizes secure access to user data by third party data consumers in a way that gives users control, preserves privacy, and/or creates value for an end user. This platform encourages data aggregators to allow third party data consumers to access, in a secure and private manner, valuable user data collected via the frontline services. From a business perspective, this platform helps even the playing field for data use between the larger entities that are likely to be data aggregators and the smaller entities that are likely to be the third party data consumers.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses techniques and technologies for collecting and maintaining user data within a first party silo while allowing third party data consumers to use the user data in accordance with explicit input from users. The disclosed system provides a user with transparency and control with regard to data use by displaying graphical user interfaces configured to receive input indicating whether the user allows or prevents third party data consumers to use his or her data. The system exposes an application programming interface (API) that enables the third party data consumers to submit a data query. The system uses the data query to internally analyze a user data set. User data is included in the user data set in accordance with the input. The system is configured to provide, via the API, a result of the analysis to the third party data consumer that submitted the data query without providing the user data set.

Various examples, scenarios, and aspects of the disclosed techniques are described below with reference to FIGS. 1-7.

Figure 1:
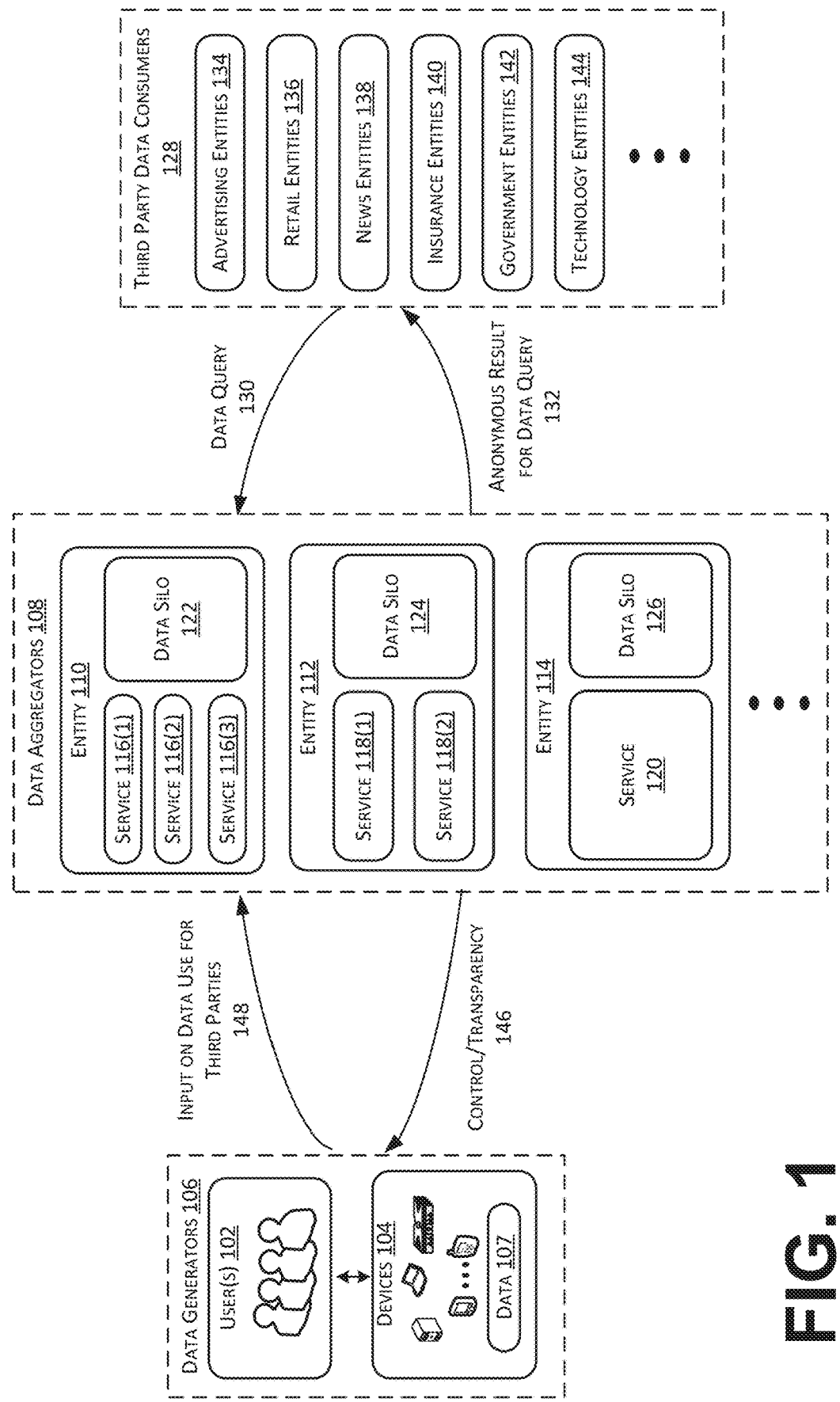
FIG. 1 is a diagram illustrating an example environment in which various entities described herein can interact in order to provide users with transparency and control with regard to how data they generate is used by third party data consumers.

FIG. 1 is a diagram illustrating an example environment 100 in which various entities described herein can interact in order to provide users with transparency and control with regard to how data they generate is used by third party data consumers. As shown in FIG. 1, users 102 and corresponding user devices 104 are data generators 106. Based on the use of, and/or the interactions with, network-based resources, the data generators 106 are the sources of valuable data 107 that can be used to benefit individual users, the general population, or a subset of the general population (e.g., a particular age group, a particular gender, a particular income level, those who travel frequently, those who commute to work, etc.).

Data aggregators 108 include network entities 110, 112, 114 that develop and offer services to the data generators 106. As shown, entity 110 may offer services 116(1-3), entity 112 may offer services 118(1-2), and entity 114 may offer service 120. Different entities 110, 112, 114 typically offer a different number of services, and the number of services offered may range from a single service to a large number of services (e.g., twenty, fifty, one hundred, etc.). Examples of a service include, but are not limited to: a browsing service, an online search service, a news service, a payment service, a gaming service, a social network service, an enterprise network service, a chat service, a streaming service, a marketplace service, productivity services (e.g., a word processing application, a spreadsheet application, a presentation application, a collaboration or video conference application, an email client, a calendar application, a storage application, etc.), a map/traffic service, a weather service, an operating system (OS) service, or any other network-based resource that is capable of collecting data 107 associated with user activity. The user activity can be based on active input (e.g., network interactions such as clicks or scrolling) or monitored input based on sensors (e.g., user movements, biometric data, etc.). The service may be offered via a browser (e.g., a Web application), a stand-alone application, an operating system component, a sensor, etc., each of which may be installed on or in some way connected to a user device 104 so that user data can be collected by entities 110, 112, 114.

The collected data is securely stored by each of entities 110, 112, 114 in corresponding data silos 122, 124, 126. The data silos 122, 124, 126 comprise data storage resources (e.g., databases) that are configured to protect the data collected by each of the entities 110, 112, 114 from external access. That is, data privacy mechanisms are implemented so that external entities cannot view the user data collected by each of entities 110, 112, 114.

Third party data consumers 128 include external network entities that, for various reasons or purposes, want to analyze the user data collected by one or more of the data aggregators 108 to determine actionable information. Via the techniques described herein, a third party data consumer 128 is configured to submit a data query 130 to one of more of the data aggregators 108. Each data aggregator 108 (e.g., entities 110, 112, 114) to which the data query 130 is submitted separately processes the data query 130. For instance, the data query 130 may include an algorithm to be executed on user data siloed by one or more of the entities 110, 112, 114. The entities 110, 112, 114 can execute the algorithm on the user data and provide a result for the data query 132 to the third party data consumer 128 that submitted the data query 130. The result 132 is provided without providing the actual user data used to obtain the result 132. The result 132 may be referred to as an "anonymous" result because the third party data consumer that submitted the data query 130 is unable to view user data that is attributed to, or generated by, an identified user.

To this end, examples of a third party data consumer 128 are shown in FIG. 1. An advertising entity 134 may submit a data query 130 configured to obtain a result 132 that can be used to better target advertisements. A retail entity 136 may submit a data query 130 configured to obtain a result 132 that can be used to better stock retail shelves or a warehouse inventory with product for an event (e.g., a holiday). A news entity 138 may submit a data query 130 configured to obtain a result 132 that can be used to better provide news content to its readers (e.g., layout of content, type of content, length of content, etc.). An insurance entity 140 may submit a data query 130 configured to obtain a result 132 that can be used to identify risk so that insurance rates can be more accurately calculated. A government entity 142 may submit a data query 130 configured to obtain a result 132 that can be used to re-allocate resources to different locations and/or groups. In the final example, a technology entity 144 may submit a data query 130 configured to obtain a result 132 that can be used to identify a need for technological improvement or innovation. The reasons or purposes for data use is endless, and thus, various different types of entities beyond those illustrated in FIG. 1 can qualify as third party data consumers 128.

Generally, a data aggregator 108 is likely a company or organization that is able to collect a large amount of user data and create "rich" data feature sets via various services that are popular and used by a large number of users 102. In contrast, a third party data consumer 128 is likely a company or organization that may have an online presence, but does not have the ability to collect as much user data as the data aggregator 108. For instance, the third party data consumer 128 may be a company that hosts a single web site (e.g., "www.shoppingcompanyABC.com") that has a small customer base that needs to be expanded. Accordingly, while a third party data consumer 128 may collect and use its own user data based on interactions with its web site and in accordance with user approval, the third party data consumer 128 may still want to submit a data query to a data aggregator 108 so that the data query 130 can be executed on a richer data set that the third party data consumer 128 does not, or cannot, possess.

In various examples, a third party data consumer 128 and a data aggregator 108 can be part of a same company or organization. For instance, a data aggregation entity may include a productivity suite platform of the company or organization, capable of collecting large amounts of user data based on its use. The third party data consumption entity may include a gaming platform of the same company or organization, which would like to execute a data query on the user data collected by the productivity suite platform.

As described above, once users 102 and user devices 104 generate data 107 by using and interacting with various services, the further use of this data is typically opaque to the users 102. Accordingly, the data aggregators 108 are configured to provide the users 102 with control and transparency 146 with regard to how their data 107 is to be used. As further described herein, various graphical user interfaces (UIs) can be displayed that enable the users 102 to provide input that controls the extent to which their data is used by the data aggregators 108 on behalf of the third party data consumers 128.

Figure 2:
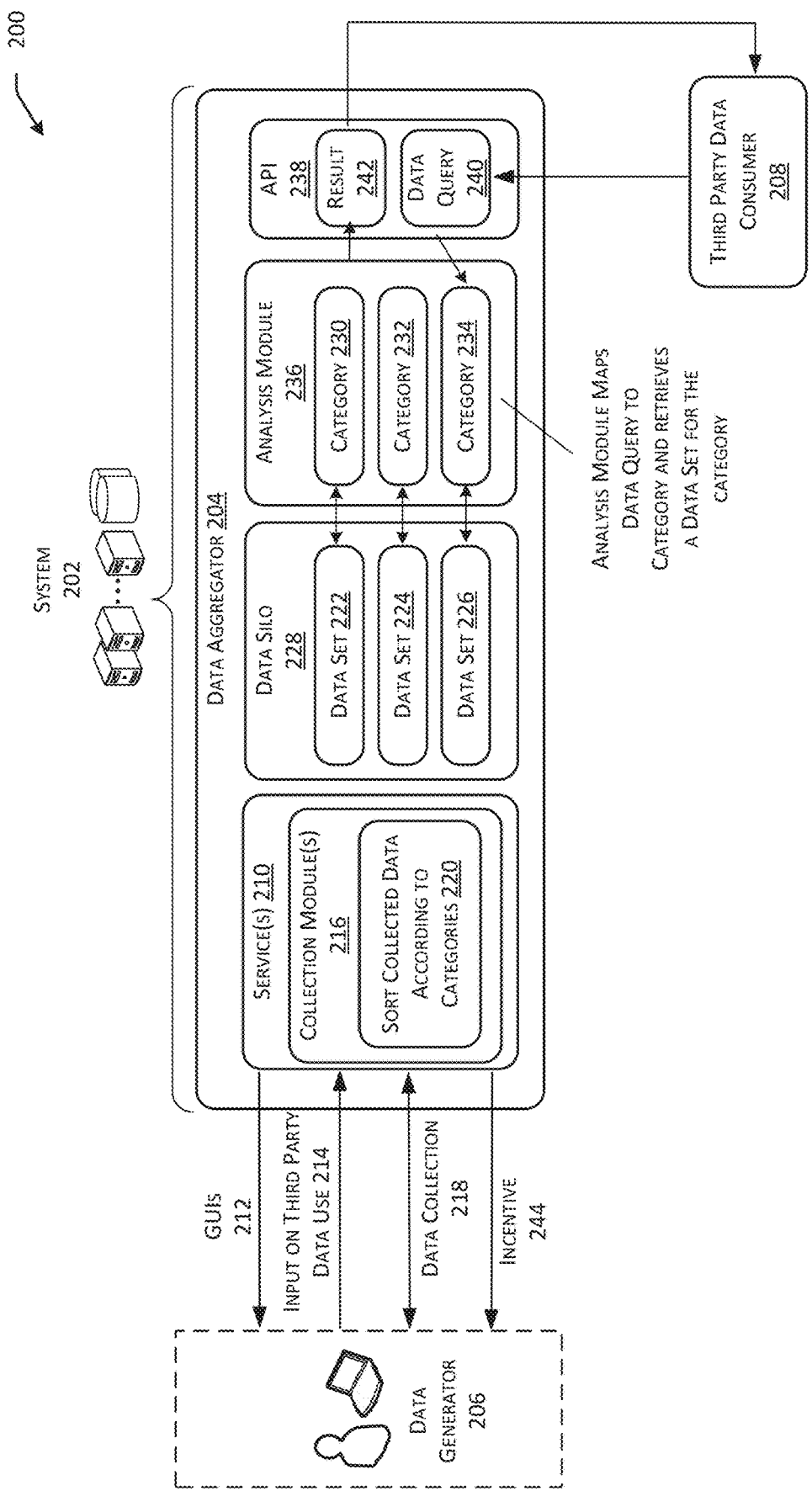
FIG. 2 is a diagram illustrating an example environment in which a system operated by a data aggregator can interact with a data generator (e.g., a user) to provide transparency and control with regard to how user data is used by a third party data consumer.

FIG. 2 is a diagram illustrating an example environment 200 in which a system 202 operated by a data aggregator 204 (e.g., one of entities 110, 112, 114 illustrated in FIG. 1) can interact with a data generator 206 (e.g., one of the users 102 illustrated in FIG. 1) to provide transparency and control with regard to how the user's data is used by a third party data consumer 208 (e.g., one of the example third party data consumers 128 illustrated in FIG. 1).

As shown, the system 202 includes one or more services 210, examples of which are described above. As further described herein, the service(s) 210 are configured to provide the user with various graphical UIs 212 directed to receive input with regard to third party data use 214. For example, the system 202 can determine that a user has accessed a service 210, and based on this determination, the system 202 can display a notification that guides the user to a dashboard with controls for how the user data can be used by third party data consumers.

The service(s) 210 include corresponding collection module(s) 216 configured to implement data collection 218. As shown, the collection module(s) 216 are included in the network-based system 202. However, it is understood in the context of this disclosure that the collection module(s) 216 can work with client side components installed on the user devices (e.g., browsers, apps, sensors, OS components, etc.) to implement the data collection 218.

The collection module 216 is further configured to sort collected data according to data categories 220, and securely store the sorted data in various data sets 222, 224, 226 in the data silo 228 according to the data categories 230, 232, 234. Data categories can be broadly or narrowly defined and can include, for example: browsing data, search data, payment data, health/exercise data, location data, social network data, news consumption data, etc. An additional data category can include personal information for each user. This information may contain one or more of: an age or age range, a gender or gender identification, ethnicity, a profession, an income level, family information, personal interests, and so forth. In one example, a user's personal information can be defined via accounts, which are password protected and used to access the services 210. While the techniques described herein can be implemented on user data that is not supplemented with this personal information, this personal information provides value when it supplements the other user data. Accordingly, via the techniques described herein, a user has the ability to define which aspects of his or her personal information can be used to supplement his or her browsing data, searching data, social networking data, and so forth.

In one configuration, the input 214 provided by the user is general authorization that enables use of all the user's data in any data query submitted by third party data consumers. This general authorization can apply to data queries that have already been received and are currently being executed by the data aggregator 204 or to future data queries that have not yet been received. Alternatively, the general authorization can be provided at a more granular level. For example, a user may allow use of data collected via one service (e.g., a searching service), yet prevent use of data collected via another service (e.g., a payment service). Or, a user may allow use of data that belongs to one data category (e.g., browsing data), yet prevent use of data that belongs to another data category (e.g., health/exercise data). In some scenarios, a service may be configured to only collect data that belongs to a single data category. However, in other scenarios, a service may be configured to collect data that belongs to different types of data categories. It is worth noting, that a single instance of data may belong to more than one data category.

The system 202 further includes an analysis module 236 and an application programming interface (API) 238. The system 202 exposes the API 238 to the third party data consumer 208 so that the third party data consumer 208 can request, via the API 238, use of the user data by submitting a data query 240. The data query 240 may comprise an algorithm to be executed internally by the data aggregator 204. The algorithm may be a proprietary algorithm developed by the third party data consumer 208. Alternatively, the algorithm may be one that is developed by the data aggregator 204 or some other entity and made available to the third party data consumer 208. Accordingly, the data query 240 may identify the algorithm to be used, or simply "ask a question" which the analysis module 236 can use to identify an algorithm to be used.

The analysis module 236 is configured to evaluate the data query 240 and map the data query 240 to a corresponding data category 234, so that an appropriate data set 226 can be identified and retrieved. Accordingly, the analysis module 236 retrieves the data set 226 and executes the data query on, or against, the data set 226 to produce an anonymous result 242 that is provided to the third party data consumer 208 via the API 238.

Because the data query 240 is executed on the data set internally (e.g., within a secured system 202), the result 242 is provided to the third party data consumer 208 without providing a direct view of the raw user data to the third party data consumer 208. The third party data consumer 208 can use the result 242 of the data query 240 to implement a strategy. In some scenarios, the data query 240 and the result 242 enable the third party data consumer to provide a better network experience to a subset of the general population, including the users whose data makes up the user data set on which the data query is executed (e.g., females between the ages of 20-25, home owners, people with income between $50,000 and $75,000, etc.).

In various examples, the system 202 is configured to notify the user of a specific data query 240 and/or an identification of a third party data consumer 208 that submitted the data query 240 when the user's data is set to be used in the data query 240 based on previous user input. The notification can include, or provide access to, an option for the user to opt out or prevent use of his or her data for the data query 240.

In another configuration, the system 202 is configured to prompt, via the graphical UI 212, the user for authorization to use his or her data for a specific data query 240. For instance, the user may define a setting indicating that a user would like to be asked whether his or her data can be used on a query-by-query basis. Accordingly, the prompt can inform the user of the data query 240, identify the third party data consumer 208 that is the source of the data query 240, describe the data query 240, and/or ask the user for approval to use his or her data for the data query 240. While users may have more control and transparency using this configuration that requests approval on a query-by-query basis compared to the aforementioned general authorization, some users may prefer the general authorization so that they do not have to expend the effort to provide input on a query-by-query basis. Practically, a data aggregator may receive a large number of data queries over a short period of time.

In various embodiments, the system 202 is configured to offer an incentive 244 for the user to allow the use of his or her user data by third party data consumers. The system 202 can provide the incentive 244 to the user based on input indicating that the user allows the use of his or her user data by the third party data consumers. The incentive 244 can take various forms. In one example, the incentive 244 is provided by the data aggregator 204 and provides a free or a discounted subscription to one of its services. In another example, the incentive 244 is provided by the data aggregator 204 and provides cash back for any products purchased via its services or advertisements displayed via its services (e.g., 1% cash back). The incentive can be based on a number of times a user's data is used in a data query.

In further examples, the incentive 244 is provided by the third party data consumer 208. For instance, in exchange for a user allowing his or her data to be used, the third party data consumer may inform the system 202 to offer a free or a discounted subscription to a service offered by the third party data consumer 208. Consequently, the system 202 may serve as an intermediate agent that connects the third party data consumer 208 with the data generator 206, for the benefit of both. In this scenario, the user data collected by the data aggregator 204 remains siloed and protected.

In one embodiment, the graphical UI 212 can indicate that use of the user data amounts to a donation to the third party data consumer 208. Accordingly, the third party data consumer 208 may be an organization with a good cause that has a strong emotional effect on people (e.g., medical research for a disease or mental health, a study on the effects humans have on climate change, etc.), yet may not have the resources to provide an incentive.

Consequently, the system 202 provides a platform that standardizes secure access to user data by third party data consumers in a way that gives users control, preserves privacy, and/or creates value for an end user. In one example, the third party data consumers may provide an incentive to the data aggregator to enable access to the user data via the API. Thus, the platform encourages data aggregators to enable third party data consumers to access, in a secure and private manner, valuable user data collected via the frontline services. From a business perspective, this platform helps even the playing field for data use between the larger entities that are likely to be data aggregators and the smaller entities that are likely to be the third party data consumers.

It is understood in the context of this invention that the system 202 can replicate the aforementioned functionality across a large number of resources. Accordingly, in various examples, device(s) of the system 202 can include one or more computing devices that operate in a cluster or other grouped configuration to share resources, balance load, increase performance, provide fail-over support or redundancy, or for other purposes. For instance, device(s) of the system 102 can belong to a variety of classes of devices such as server-type devices, desktop computer-type devices, mobile-type devices, special purpose-type devices, etc. A user or client device used by a user to generate user data can include, but is not limited to, a desktop computer, a game console and/or a gaming device, a tablet computer, a personal data assistant (PDA), a mobile phone/tablet hybrid, a laptop computer, a telecommunication device, a wearable device, a work station, an augmented or virtual reality device, an Internet-of-Things (IoT) device, an embedded device, or any other sort of computing device.

Further, the number of illustrated modules in FIG. 2 is just an example, and the number can vary higher or lower. That is, functionality described in association with the illustrated modules can be performed by a fewer number of modules or a larger number of modules on one device or spread across multiple devices.

As described above, the system 202 is configured to cause one or more graphical UIs to be displayed to the user on a user device. The graphical UIs enable the user to control how his or her data is used. Example graphical UIs are described below with respect to FIGS. 3A-4. While separate graphical UIs are illustrated, it is understood in the context of this disclosure that the content communicated in the graphical UIs can be presented in more or less graphical UIs. The graphical UIs are configured to present UI elements configured to receive input indicating whether the user allows or prevents use of the user data collected via one or more services.

Figure 3A:
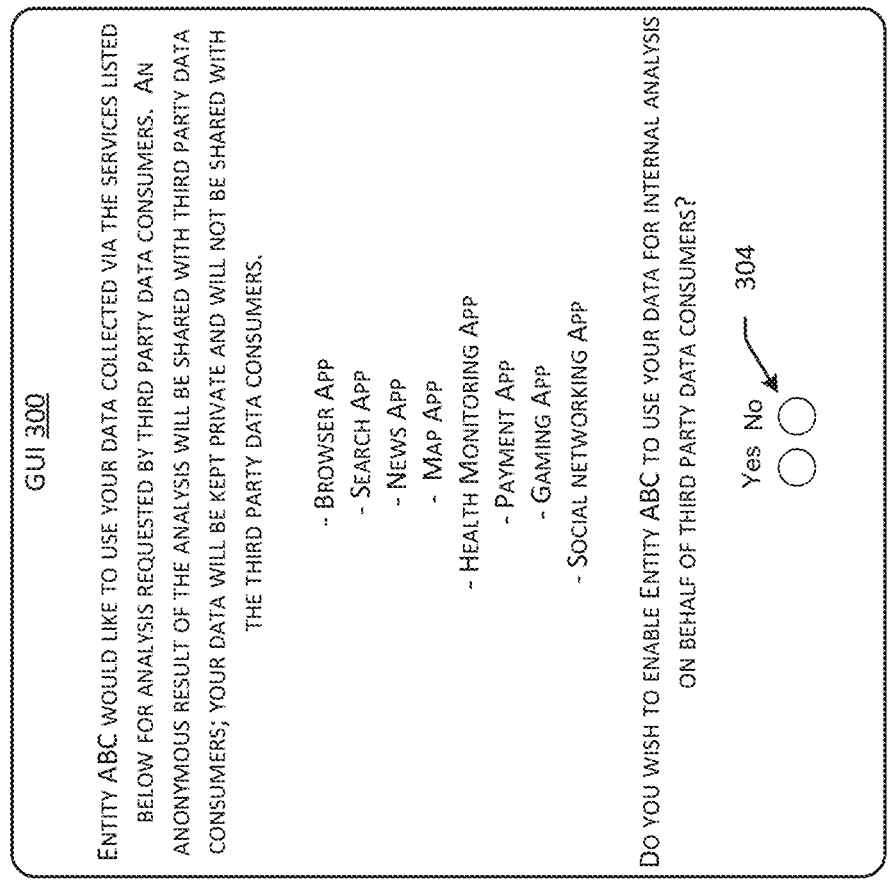
FIG. 3A is an example graphical user interface illustrating a message indicating that an entity would like to use a user's data on behalf of third party data consumers, without providing the user data or a view into the user data to the third party data consumers.
Figure 3A:
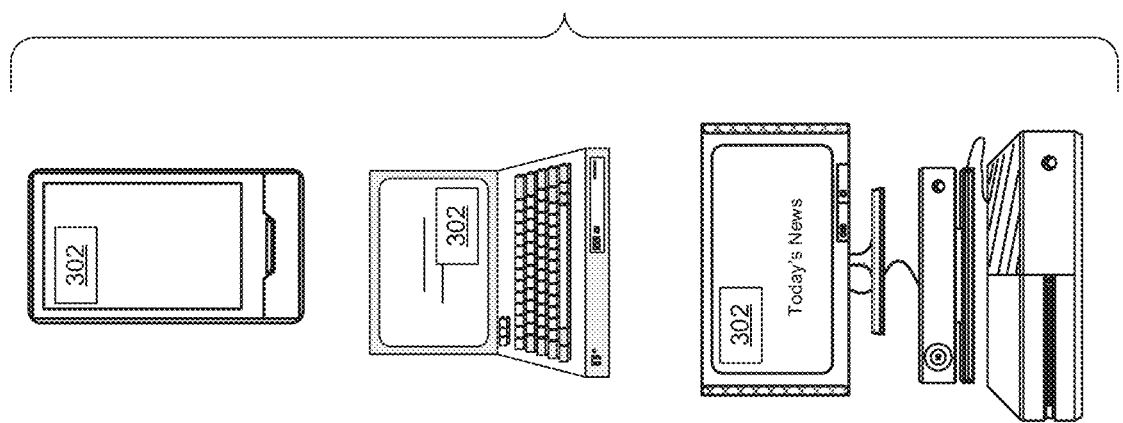

FIG. 3A is an example graphical UI 300 illustrating a message that Entity ABC would like to use a user's data on behalf of third party data consumers, without providing the user data or a view into the user data to the third party data consumers. A user can access the example graphical UI 300 by accessing a settings menu and/or one or more account controls. Alternatively, the system 202 can determine that a user has accessed a service (e.g., logged into an account), and based on this determination, the system 202 can display a notification 302 that upon selection navigates the user to the graphical UI 300.

As shown, the graphical UI 300 lists the services offered by Entity ABC via which Entity ABC collects data and stores the data for further use (e.g., a browser app, a search app, a news app, a map app, a health monitoring app, a payment app, a gaming app, and a social networking app, etc.). In one example, each of the listed services may be offered via a registered user account. Further, the example graphical UI 300 includes a UI element 304 that enables the user to provide general authorization to allow or prevent use of the data collected via the listed services.

Figure 3B:
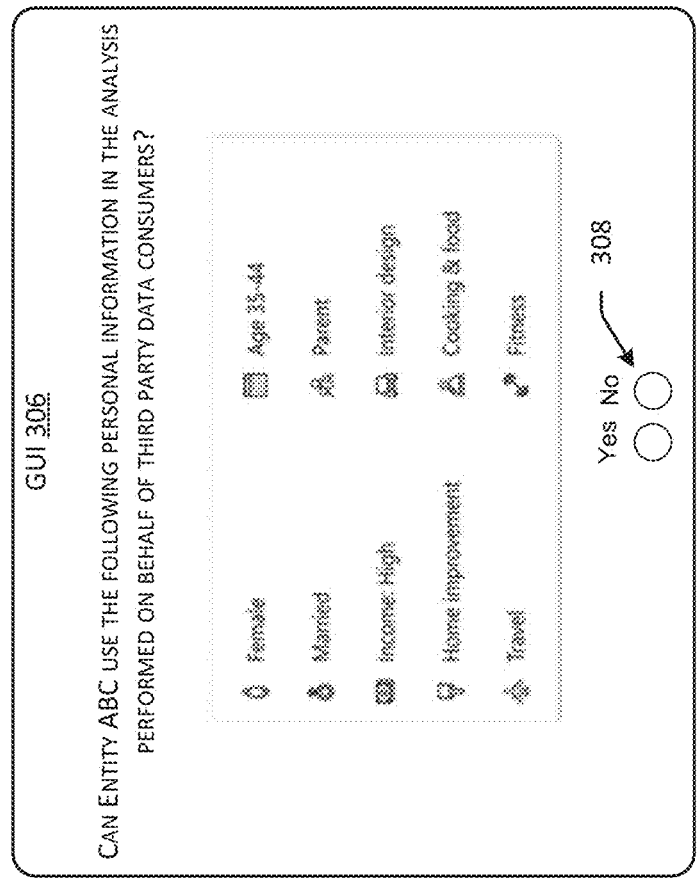
FIG. 3B is an example graphical user interface illustrating a message indicating that an entity would like to use a user's personal information to supplement the use of the user's data on behalf of third party data consumers.
Figure 3B:
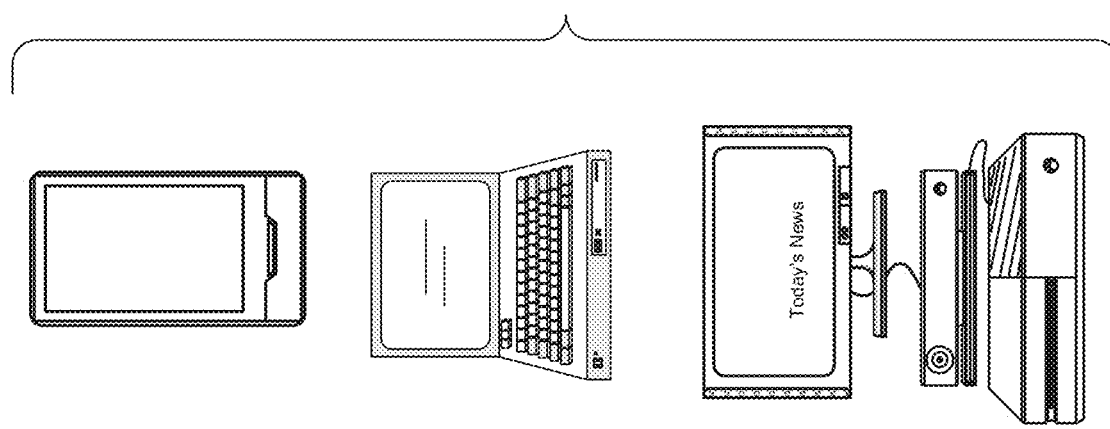

FIG. 3B is an example graphical UI 306 illustrating a message indicating that an entity would like to use a user's personal information to supplement the use of the user's data on behalf of third party data consumers. This content can be displayed if the user allows his or her data to be used (e.g., based on a "yes" input to the UI element 304 in FIG. 3A). As shown, the current user is a married female between ages of 35-44, has a "high" income and at least one child, and has interests in home improvement, travel, interior design, cooking & food, and fitness. The example graphical UI 306 includes a UI element 308 that enables the user to provide authorization to allow or prevent the use of personal information in accordance with the data collected via the services illustrated in FIG. 3A. In some embodiments, each of the different pieces of personal information can be selected and/or de-selected for use.

Figure 3C:
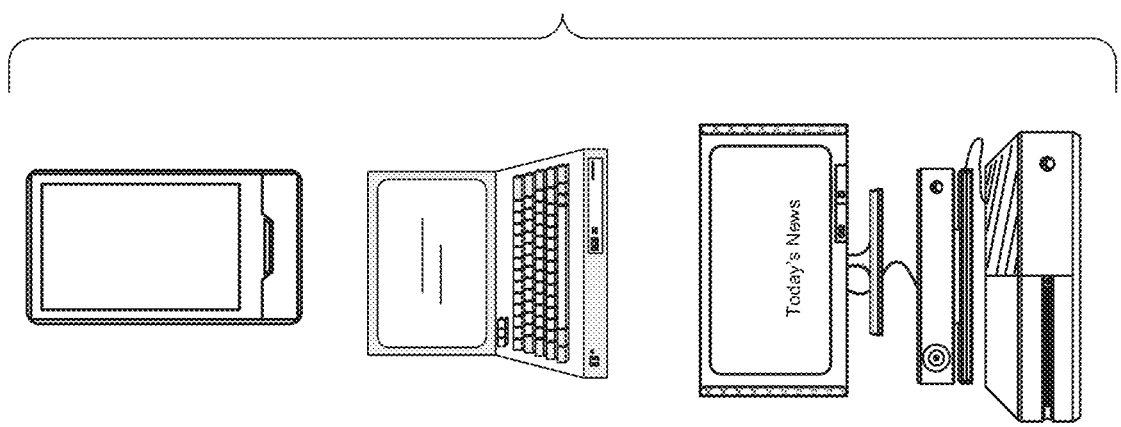
FIG. 3C is an example graphical user interface illustrating a message indicating that an entity would like to use a user's data on behalf of third party data consumers and options for the user to define different categories for data use.

FIG. 3C is an example graphical UI 310 illustrating a message indicating that an entity would like to use a user's data on behalf of third party data consumers and UI elements 312, 314, 316, 318 associated with functionality that allows or prevents use of the user data in association with different data categories (e.g., browsing data, search data, location data, payment data). Accordingly, the user is provided with functionality to manage and control data use at a more granular level compared to the general authorization provided in FIG. 3A.

Figure 3D:
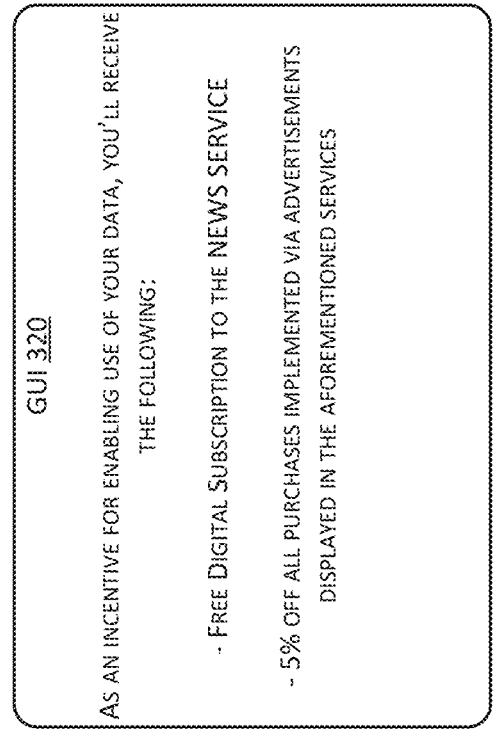
FIG. 3D is an example graphical user interface illustrating an incentive offered to the user for allowing the use of user data on behalf of third party data consumers.
Figure 3D:
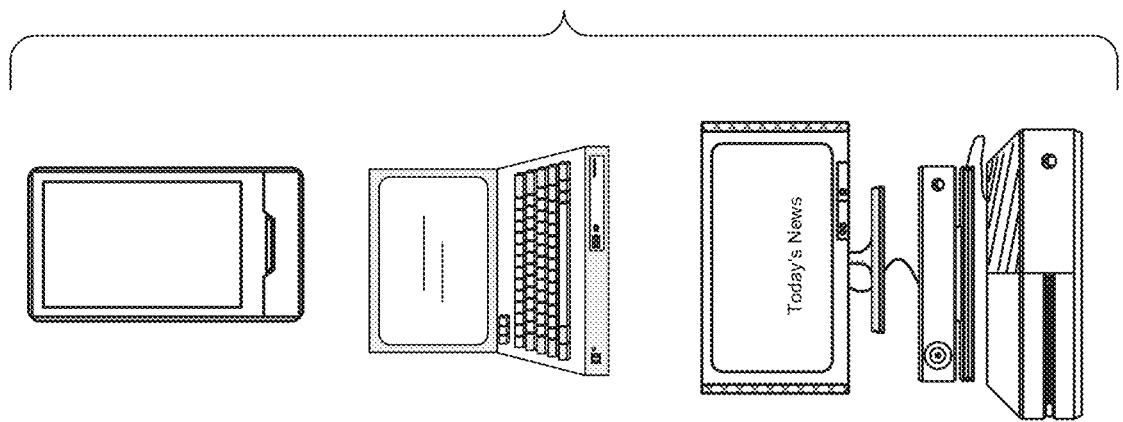

FIG. 3D is an example graphical UI 320 illustrating an incentive offered to the user for allowing the use of user data on behalf of third party data consumers. For example, Entity ABC may offer a free digital subscription to the "News Service" in exchange for the user allowing his or her data to be used. In another example, Entity ABC may offer 5% off all purchases implemented via advertisements displayed in the aforementioned services (of FIG. 3A).

Figure 3E:
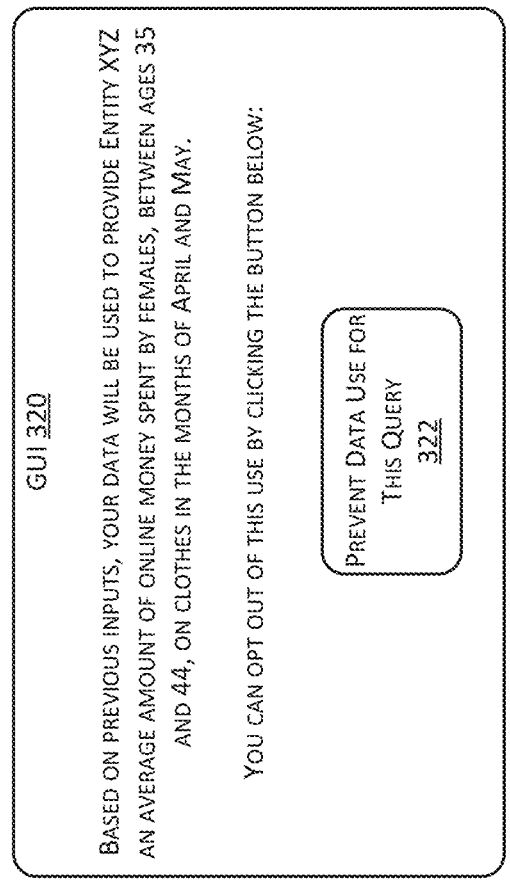
FIG. 3E is an example graphical user interface illustrating a notification of a specific data query that is about to be executed on a data set that includes the user's data.
Figure 3E:
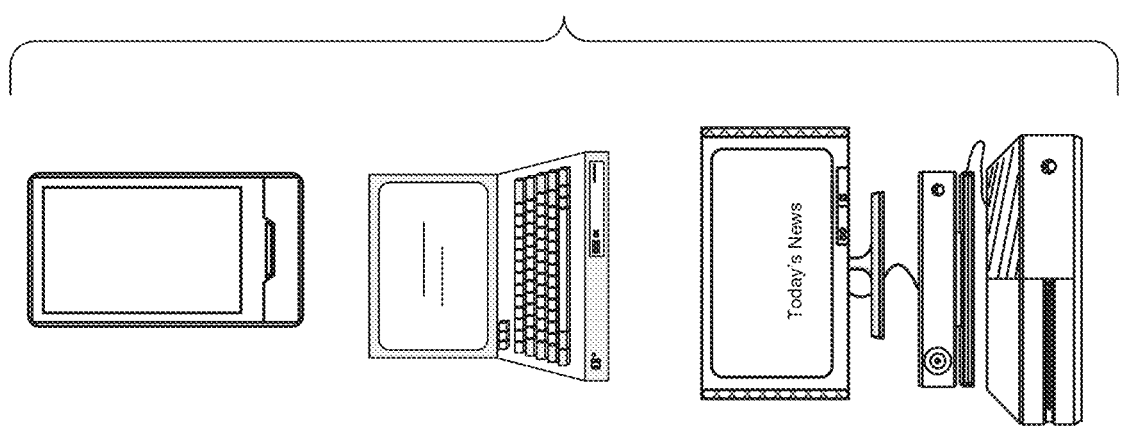

FIG. 3E is an example graphical UI 320 illustrating a notification of a specific data query that is about to be executed on a data set that includes the user's data. At the time this information is displayed, the user's data is already included in the data set via previous input. However, to provide additional transparency and control, the example graphical UI 320 can be displayed to inform the user of the specific data query and to identify the third party data consumer, and to provide the user with the opportunity to remove her data from the data set via the graphical UI element 322.

Figure 4:
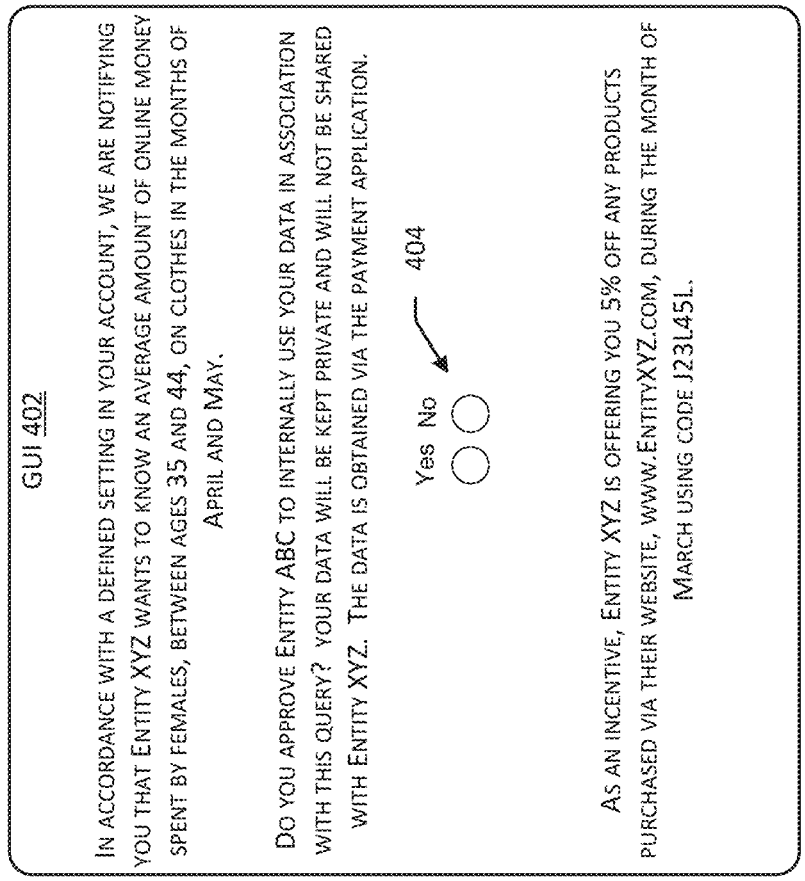
FIG. 4 is another example graphical user interface illustrating a message indicating that an entity would like to use a user's data for a specific data query on behalf of an identified third party data consumer, without providing the user data or a view into the user data to the identified third party data consumer.
Figure 4:
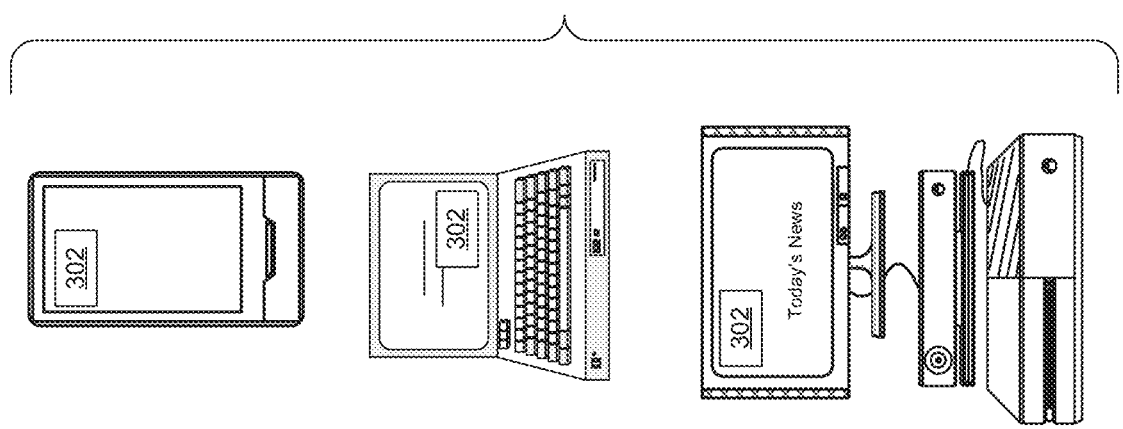

FIG. 4 is another example graphical UI 402 illustrating a message indicating that an entity would like to use a user's data for a specific data query on behalf of an identified third party data consumer, without providing the user data or a view into the user data to the identified third party data consumer. As shown, Entity ABC is asking the user if her data can be used to provide Entity XYZ with an average amount of online money spent by females, between ages of 35 and 44, on clothes in the months of April and May. The user can provide input allowing or preventing the use of her data via the graphical UI element 404. The example graphical UI 402 further provides an incentive for the user to allow her data to be used. In this example, the incentive is provided by Entity XYZ (e.g., 5% off any products purchased via www.EntityXYZ.com during the month of March using code J23L45L).

Figure 5A:
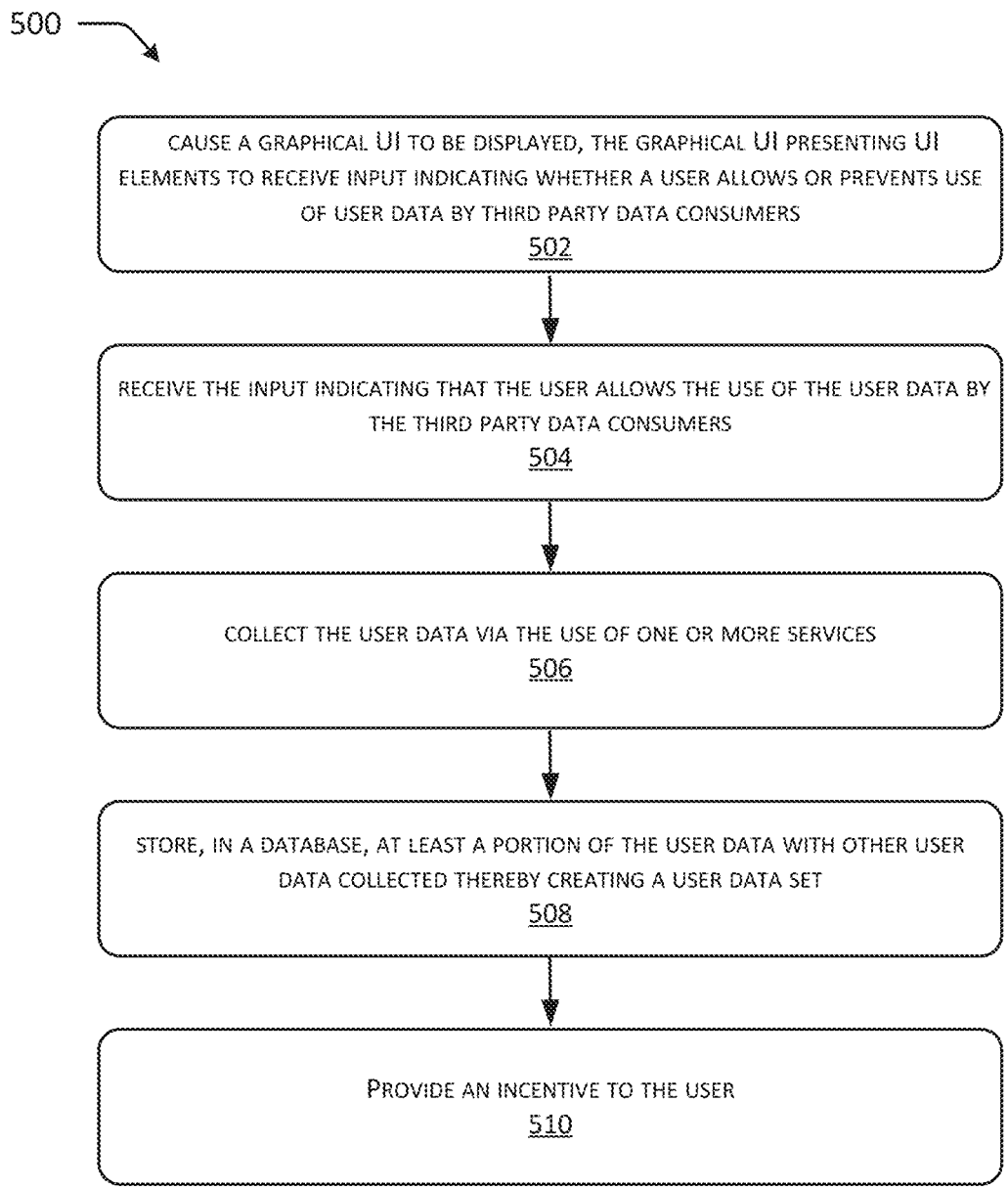
FIG. 5A is a flow diagram of an example method for requesting general user approval for data use.
Figure 5B:
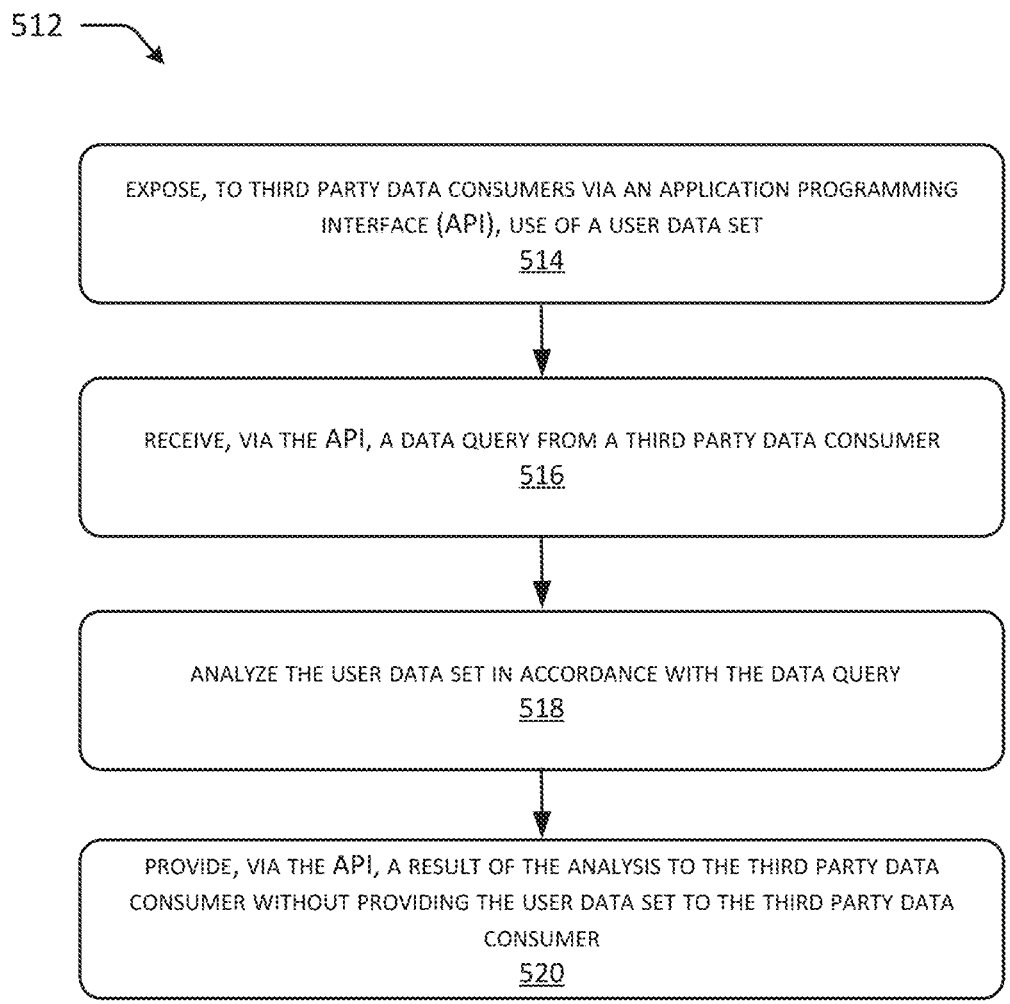
FIG. 5B is a flow diagram of an example method for third party data use in association with user approval.
Figure 6:
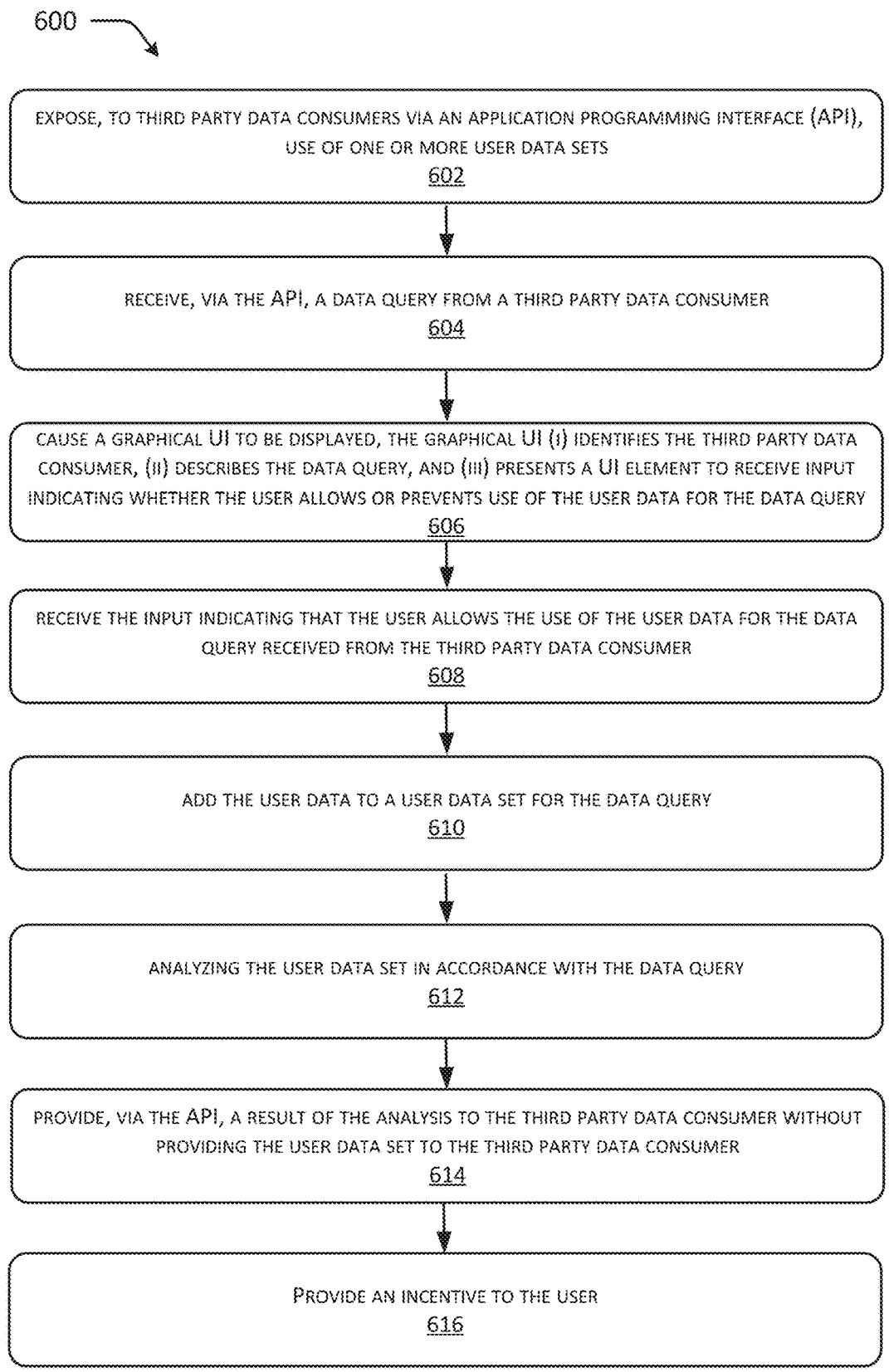
FIG. 6 is a flow diagram of an example method for requesting user approval for data use on a query-by-query basis.

FIGS. 5A, 5B, and 6 represent example processes in accordance with various examples from the description of FIGS. 1-4. The example operations shown in FIGS. 5A, 5B, and 6 can be implemented on or otherwise embodied in one or more device(s) of the system 202.

The order in which the operations are described is not intended to be construed as a limitation, and any number of the described operations can be combined in any order and/or in parallel to implement each process. Moreover, the operations in each of FIGS. 5A, 5B, and 6 can be implemented in hardware, software, and/or a combination thereof. In the context of software, the operations represent computer-executable instructions that, when executed by one or more processing units, cause one or more processing units to perform the recited operations. For example, modules and other components described herein can be stored in a computer-readable media and executed by at least one processing unit to perform the described operations.

FIG. 5A is a flow diagram of an example method 500 for requesting general user approval for data use. At operation 502, a graphical UI is caused to be displayed. As described above, the graphical UI can present UI elements to receive input indicating whether a user allows or prevents use of user data by third party data consumers. In one example, different UI elements are associated with different data categories and/or different services. At operation 504, input indicating that the user allows the use of the user data by the third party data consumers is received.

At operation 506, the user data is collected via the use of one or more services. At operation 508, at least a portion of the user data is stored with other user data collected thereby creating a user data set. As described above, the user data may be associated with a particular data category to which various data queries can be mapped.

In various embodiments, at operation 510, an incentive is provided to the user in exchange for the user allowing the use of his or her data in association with the techniques described herein.

FIG. 5B is a flow diagram of an example method 512 for third party data use in association with user approval. Individual operations in FIG. 5B may occur before, after or in concurrence with individual operations in FIG. 5A. At operation 514, an API is exposed to third party data consumers, the API enabling use of a siloed user data set. At operation 516, a data query is received from a third party data consumer via the API. At operation 518, the user data set is analyzed in accordance with the data query. At operation 520, a result of the analysis is provided to the third party data consumer via the API. The result of the analysis is provided without providing the user data set.

FIG. 6 is a flow diagram of an example method 600 for requesting user approval for data use on a query-by-query basis. At operation 602, an API is exposed to third party data consumers, the API enabling use of a siloed user data set. At operation 604, a data query is received from a third party data consumer via the API. At operation 606, a graphical UI is caused to be displayed. The graphical UI (i) identifies the third party data consumer, (ii) describes the data query, and (iii) presents a UI element to receive input indicating whether the user allows or prevents use of the user data for the data query.

At operation 608, the input indicating that the user allows the use of the user data for the data query received from the third party data consumer is received. At operation 610, the user data is added to a user data set for the data query. At operation 612, the user data set is analyzed in accordance with the data query. At operation 614, a result of the analysis is provided to the third party data consumer via the API. The result of the analysis is provided without providing the user data set.

In various embodiments, at operation 616, an incentive is provided to the user in exchange for the user allowing the use of his or her data.

Figure 7:
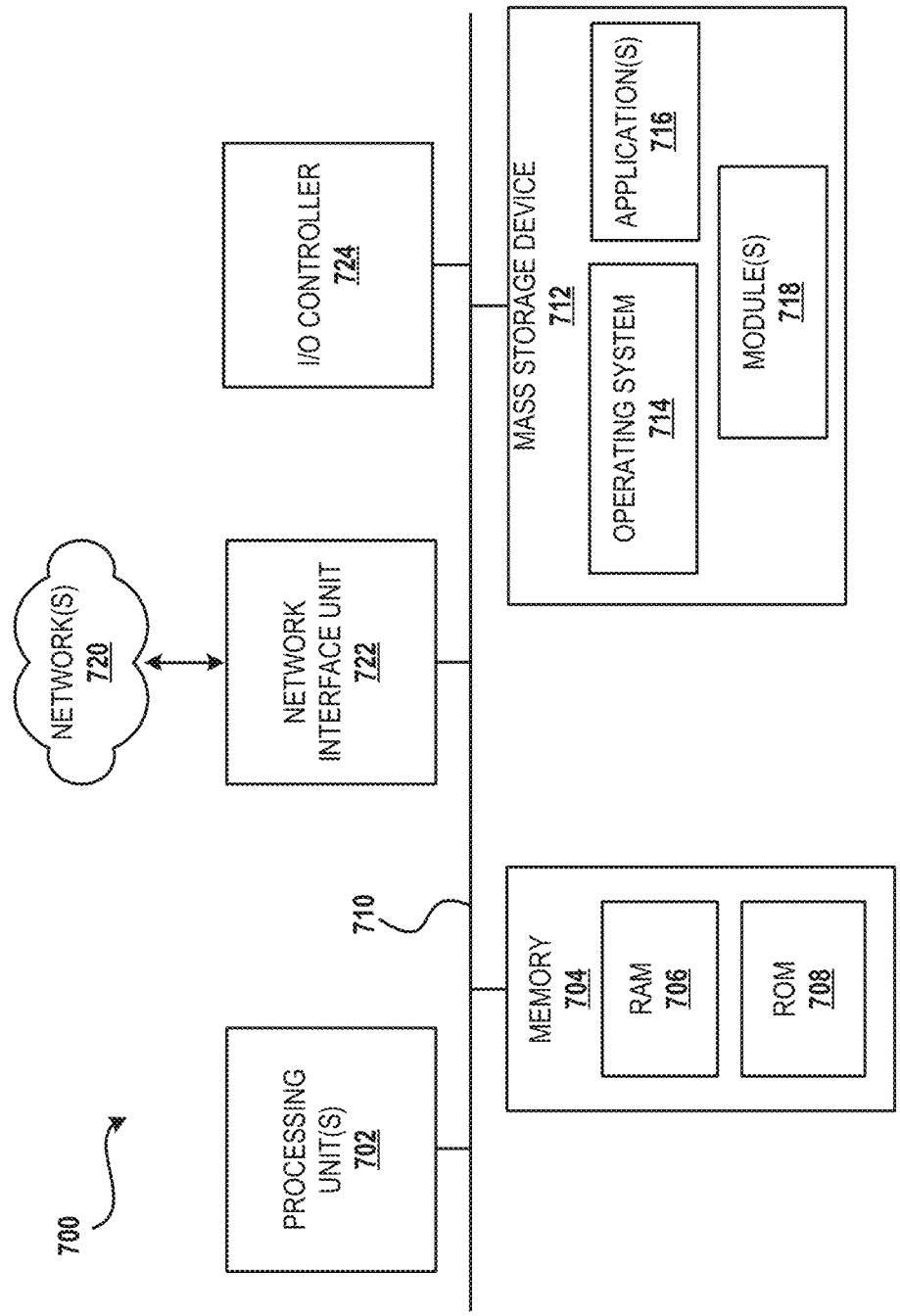
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the system 202, capable of executing computer instructions (e.g., a module or a program component described herein). The computer architecture 700 illustrated in FIG. 7 includes processing unit(s) 702, a system memory 704, including a random access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718 (e.g., the collection module, the analysis module, etc.), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network(s) 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

Network(s) 720 can include, for example, public networks such as the Internet, private networks such as an institutional and/or personal intranet, or some combination of private and public networks. Network(s) 720 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 720 can utilize communications protocols, including packet-based and/or datagram-based protocols such as internet protocol (IP), transmission control protocol (TCP), user datagram protocol (UDP), or other types of protocols. Moreover, network(s) 720 can also include a number of devices that facilitate network communications and/or form a hardware basis for the networks, such as switches, routers, gateways, access points, firewalls, base stations, repeaters, backbone devices, and the like.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

The disclosure presented herein also encompasses the subject matter set forth in the following clauses.

Example Clause A, a method for an entity to transparently collect and store user data for secure use by third party data consumers, comprising: causing a graphical user interface (UI) to be displayed, the graphical UI presenting a plurality of data categories and corresponding UI elements to receive input indicating whether the user allows or prevents use of the user data by the third party data consumers for individual ones of the plurality of data categories; receiving the input indicating that the user allows the use of the user data for a particular data category of the plurality of data categories; collecting, by one or more processing units, the user data via the use of one or more services hosted by the entity; storing, in a database, at least a portion of the user data with other user data collected for the particular data category thereby creating a user data set for the particular data category; exposing, to the third party data consumers via an application programming interface (API), use of the user data set; receiving, via the API, a data query from a third party data consumer; determining that the data query is associated with the particular data category; analyzing the user data set in accordance with the data query; and providing, via the API, a result of the analysis to the third party data consumer without providing the user data set to the third party data consumer.

Example Clause B, the method of Example Clause A, further comprising: determining that the user has accessed a service of the one or more services; and in response to determining that the user has accessed the service, causing display of a notification for the user to control how the user data is used by the third party data consumers, wherein the display of the graphical UI is implemented in response to input that selects the notification.

Example Clause C, the method of Example Clause A or Example Clause B, wherein the graphical UI lists the one or more services configured to collect the user data.

Example Clause D, the method of any one of Example Clauses A through C, further comprising: offering an incentive, in the graphical UI, for the user to allow the use of the user data by the third party data consumers; and providing the incentive to the user based at least in part on the input indicating that the user allows the use of the user data for the particular data category.

Example Clause E, the method of any one of Example Clauses A through D, wherein the data query comprises a proprietary algorithm of the third party data consumer executed on the user data set.

Example Clause F, the method of any one of Example Clauses A through E, further comprising: notifying the user of the data query and an identification of third party data consumer; and providing an option for the user to prevent the user data from being included in the user data set.

Example Clause G, a system for an entity to transparently collect and store user data for secure use by third party data consumers, comprising: one or more processing units; and computer-readable storage media storing instructions that, when executed by the one or more processing units, cause the system to perform operations comprising: causing a graphical user interface (UI) to be displayed, the graphical UI presenting UI elements to receive input indicating whether the user allows or prevents use of the user data by the third party data consumers; receiving the input indicating that the user allows the use of the user data by the third party data consumers; exposing, to the third party data consumers via an application programming interface (API), use of a user data set that includes at least a portion of the user data; receiving, via the API, a data query from a third party data consumer; analyzing the user data set in accordance with the data query; and providing, via the API, a result of the analysis to the third party data consumer without providing the user data set to the third party data consumer.

Example Clause H, the system of Example Clause G, wherein the operations further comprise: determining that the user has accessed the service; and in response to determining that the user has accessed the service, causing display of a notification for the user to control how the user data is used by the third party data consumers, wherein the display of the graphical UI is implemented in response to input that selects the notification.

Example Clause I, the system of Example Clause G or Example Clause H, wherein the operations further comprise: offering an incentive, in the graphical UI, for the user to allow the use of the user data by the third party data consumers; and providing the incentive to the user based at least in part on the input indicating that the user allows the use of the user data by the third party data consumers.

Example Clause J, the system of any one of Example Clauses G through I, wherein the data query includes an algorithm executed on the user data set.

Example Clause K, the system of Example Clause J, wherein the algorithm comprises a proprietary algorithm of the third party data consumer.

Example Clause L, the system of any one of Example Clauses G through K, wherein the operations further comprise: notifying the user of the data query and an identification of the third party data consumer; and providing an option for the user to prevent the portion of the user data from being included in the user data set.

Example Clause M, a system for an entity to transparently collect and store user data for secure use by a third party data consumer, comprising: one or more processing units; and computer-readable storage media storing instructions that, when executed by the one or more processing units, cause the system to perform operations comprising: exposing, to the third party data consumer via an application programming interface (API), use of one or more user data sets based on use of one or more services hosted by the entity; receiving, via the API, a data query from the third party data consumer; causing display of a graphical user interface (UI) that (i) identifies the third party data consumer, (ii) describes the data query, and (iii) presents a UI element to receive input indicating whether the user allows or prevents use of the user data, collected via the one or more services, for the data query received from the third party data consumer; receiving the input indicating that the user allows the use of the user data for the data query received from the third party data consumer; adding the user data to a user data set for the data query; analyzing the user data set in accordance with the data query; and providing, via the API, a result of the analysis to the third party data consumer without providing the user data set to the third party data consumer.

Example Clause N, the system of Example Clause M, wherein the operations further comprise: offering an incentive, in the graphical UI, for the user to allow the use of the user data for the data query received from the third party data consumer; and providing the incentive to the user based at least in part on the input indicating that the user allows the use of the user data for the data query received from the third party data consumer.

Example Clause O, the system of Example Clause N, wherein the incentive is offered and provided by the third party data consumer.

Example Clause P, the system of any one of Example Clauses M through O, wherein the graphical UI is displayed in accordance with a setting configured to prompt the user each time a third party data consumer provides a data query via the API.

Example Clause Q, the system of any one of Example Clauses M through P, wherein the operations further comprise: determining that the user has accessed a service of the one or more services; and in response to determining that the user has accessed the service, causing display of a notification for the user to control how the user data is used, wherein the display of the graphical UI is implemented in response to input that selects the notification.

Example Clause R, the system of any one of Example Clauses M through Q, wherein the graphical UI lists the one or more services configured to collect the user data.

Example Clause S, the system of any one of Example Clauses M through R, wherein the data query comprises a proprietary algorithm of the third party data consumer executed on the user data set.

Example Clause T, the system of Example Clause M, wherein the UI element indicates that use of the user data comprises a donation to the third party data consumer.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different operations, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method for an entity to transparently collect and store user data for secure use by third party data consumers, comprising:
    causing a graphical user interface (UI) to be displayed, the graphical UI presenting a plurality of data categories and corresponding UI elements to receive input indicating whether the user allows or prevents use of the user data by the third party data consumers for individual ones of the plurality of data categories;
    receiving the input indicating that the user allows the use of the user data for a particular data category of the plurality of data categories;
    collecting, by one or more processing units, the user data via the use of one or more services hosted by the entity;
    storing, in a database, at least a portion of the user data with other user data collected for the particular data category from other users, thereby creating an aggregate user data set for the particular data category;
    exposing, to the third party data consumers via an application programming interface (API), use of the aggregate user data set, wherein the use of the aggregate user data set by the third party data consumers does not provide a view of the user data or the other user data to the third party data consumers;
    receiving, via the API, a data query from a third party data consumer;
    determining that the data query is associated with the particular data category;
    causing a notification to be displayed, wherein the notification:
        informs the user of an identification of the third party data consumer and a reason for the data query; and
        provides the user with an option to prevent the use of the at least the portion of the user data for the data query received from the third party data consumer;
    based on a determination that the user has not selected the option to prevent the use of the at least the portion of the user data for the data query received from the third party data consumer, analyzing the aggregate user data set in accordance with the data query, the aggregate user data still including the at least the portion of the user data; and providing, via the API, a result of the analysis to the third party data consumer without providing the aggregate user data set to the third party data consumer.

2. The method of claim 1, further comprising:
determining that the user has accessed a service of the one or more services; and
in response to determining that the user has accessed the service, causing display of another notification for the user to control how the user data is used by the third party data consumers, wherein the display of the graphical UI is implemented in response to input that selects the notification.

3. The method of claim 1, wherein the graphical UI lists the one or more services configured to collect the user data.

4. The method of claim 1, further comprising:
offering an incentive, in the graphical UI, for the user to allow the use of the user data by the third party data consumers; and
providing the incentive to the user based at least in part on the input indicating that the user allows the use of the user data for the particular data category.

5. The method of claim 1, wherein the data query comprises a proprietary algorithm of the third party data consumer executed on the user data set.

6. A system for an entity to transparently collect and store user data for secure use by third party data consumers, comprising:
one or more processing units; and
computer-readable storage media storing instructions that, when executed by the one or more processing units, cause the system to perform operations comprising:
    causing a graphical user interface (UI) to be displayed, the graphical UI presenting UI elements to receive input indicating whether a user allows or prevents use of the user data by the third party data consumers;
    receiving the input indicating that the user allows the use of the user data by the third party data consumers;
    storing, in a database, at least a portion of the user data with other user data collected from other users, thereby creating an aggregate user data set;
    exposing, to the third party data consumers via an application programming interface (API), use of the aggregate user data set, wherein the use of the aggregate user data set by the third party data consumers does not provide a view of the user data or the other user data to the third party data consumers;
    receiving, via the API, a data query from a third party data consumer;
    causing a notification to be displayed, wherein the notification:
        informs the user of an identification of the third party data consumer and a reason for the data query; and
        provides the user with an option to prevent the use of the at least the portion of the user data for the data query received from the third party data consumer;
    based on a determination that the user has not selected the option to prevent the use of the at least the portion of the user data for the data query received from the third party data consumer, analyzing the aggregate user data set in accordance with the data query, the aggregate user data still including the at least the portion of the user data; and
    providing, via the API, a result of the analysis to the third party data consumer without providing the aggregate user data set to the third party data consumer.

7. The system of claim 6, wherein the operations further comprise:
determining that the user has accessed a service; and
in response to determining that the user has accessed the service, causing display of another notification for the user to control how the user data is used by the third party data consumers, wherein the display of the graphical UI is implemented in response to input that selects the notification.

8. The system of claim 6, wherein the operations further comprise:
offering an incentive, in the graphical UI, for the user to allow the use of the user data by the third party data consumers; and
providing the incentive to the user based at least in part on the input indicating that the user allows the use of the user data by the third party data consumers.

9. The system of claim 6, wherein the data query includes an algorithm executed on the aggregate user data set.

10. The system of claim 9, wherein the algorithm comprises a proprietary algorithm of the third party data consumer.

11. One or more computer-readable storage media storing instructions that, when executed by one or more processing units, cause a system to perform operations comprising:
    causing a graphical user interface (UI) to be displayed, the graphical UI presenting UI elements to receive input indicating whether a user allows or prevents use of user data by third party data consumers;
    receiving the input indicating that the user allows the use of the user data by the third party data consumers;
    storing, in a database, at least a portion of the user data with other user data collected from other users, thereby creating an aggregate user data set;
    exposing, to the third party data consumers via an application programming interface (API), use of the aggregate user data set, wherein the use of the aggregate user data set by the third party data consumers does not provide a view of the user data or the other user data to the third party data consumers;
    receiving, via the API, a data query from a third party data consumer;
    causing a notification to be displayed, wherein the notification:
        informs the user of an identification of the third party data consumer and a reason for the data query; and
        provides the user with an option to prevent the use of the at least the portion of the user data for the data query received from the third party data consumer;
    based on a determination that the user has not selected the option to prevent the use of the at least the portion of the user data for the data query received from the third party data consumer, analyzing the aggregate user data set in accordance with the data query, the aggregate user data still including the at least the portion of the user data; and
    providing, via the API, a result of the analysis to the third party data consumer without providing the aggregate user data set to the third party data consumer.

12. The one or more computer-readable storage media of claim 11, wherein the operations further comprise:
- determining that the user has accessed a service; and
- in response to determining that the user has accessed the service, causing display of another notification for the user to control how the user data is used by the third party data consumers, wherein the display of the graphical UI is implemented in response to input that selects the notification.

13. The one or more computer-readable storage media of claim 11, wherein the operations further comprise:
- offering an incentive, in the graphical UI, for the user to allow the use of the user data by the third party data consumers; and
- providing the incentive to the user based at least in part on the input indicating that the user allows the use of the user data by the third party data consumers.

14. The one or more computer-readable storage media of claim 11, wherein the data query includes an algorithm executed on the aggregate user data set.

15. The one or more computer-readable storage media of claim 11, wherein the algorithm comprises a proprietary algorithm of the third party data consumer.

* * * * *